United States Patent
Kees et al.

(10) Patent No.: US 8,375,811 B2
(45) Date of Patent: Feb. 19, 2013

(54) MASS MEASUREMENT OF A FLYWHEEL HYBRID VEHICLE

(75) Inventors: Don Andreas Josephine Kees, Billericay (GB); Robert Colin Helle-Lorentzen, Chelmsford (GB); Tim James Bowman, Bexley (GB)

(73) Assignee: Ford Global Technologies, LLC, Dearborn, MI (US)

( * ) Notice: Subject to any disclaimer, the term of this patent is extended or adjusted under 35 U.S.C. 154(b) by 512 days.

(21) Appl. No.: 12/700,995

(22) Filed: Feb. 5, 2010

(65) Prior Publication Data

US 2010/0192708 A1    Aug. 5, 2010

(30) Foreign Application Priority Data

Feb. 5, 2009  (GB) .................................. 0901827.6

(51) Int. Cl.
    *G01G 9/00*    (2006.01)
(52) U.S. Cl. ......................................................... 73/865
(58) Field of Classification Search ...................... 73/865
    See application file for complete search history.

(56) References Cited

U.S. PATENT DOCUMENTS

| 4,163,367 | A | 8/1979 | Yeh |
| 4,788,773 | A | 12/1988 | Palsgard et al. |
| 5,923,093 | A * | 7/1999 | Tabata et al. ................ 290/40 C |
| 6,299,263 | B1 | 10/2001 | Uematsu et al. |
| 6,964,188 | B2 | 11/2005 | Streit et al. |
| 2008/0105475 | A1 | 5/2008 | Hu |
| 2009/0023545 | A1* | 1/2009 | Beaudoin ........................ 476/42 |

FOREIGN PATENT DOCUMENTS

| DE | 102007033577 A1 | 1/2009 |
| EP | 1437255 B1 | 1/2007 |
| JP | 10138795 A | 5/1998 |
| JP | 2006177719 A | 7/2006 |
| JP | 2007008334 A | 1/2007 |

OTHER PUBLICATIONS

SAE 2008-01-0083, Apr. 14-17, 2008.

* cited by examiner

*Primary Examiner* — Hezron E Williams
*Assistant Examiner* — Paul West
(74) *Attorney, Agent, or Firm* — David B. Kelley; MacMillian, Sobanski & Todd, LLC

(57) ABSTRACT

An apparatus for measuring the mass of a hybrid vehicle having a prime mover, a secondary mover incorporating a flywheel, and a continuously variable transmission (CVT) being connectable with a driveline of the vehicle and with the flywheel, the apparatus including a means for measuring a rate of change of CVT ratio during a transference of energy between the hybrid vehicle and the flywheel.

4 Claims, 1 Drawing Sheet

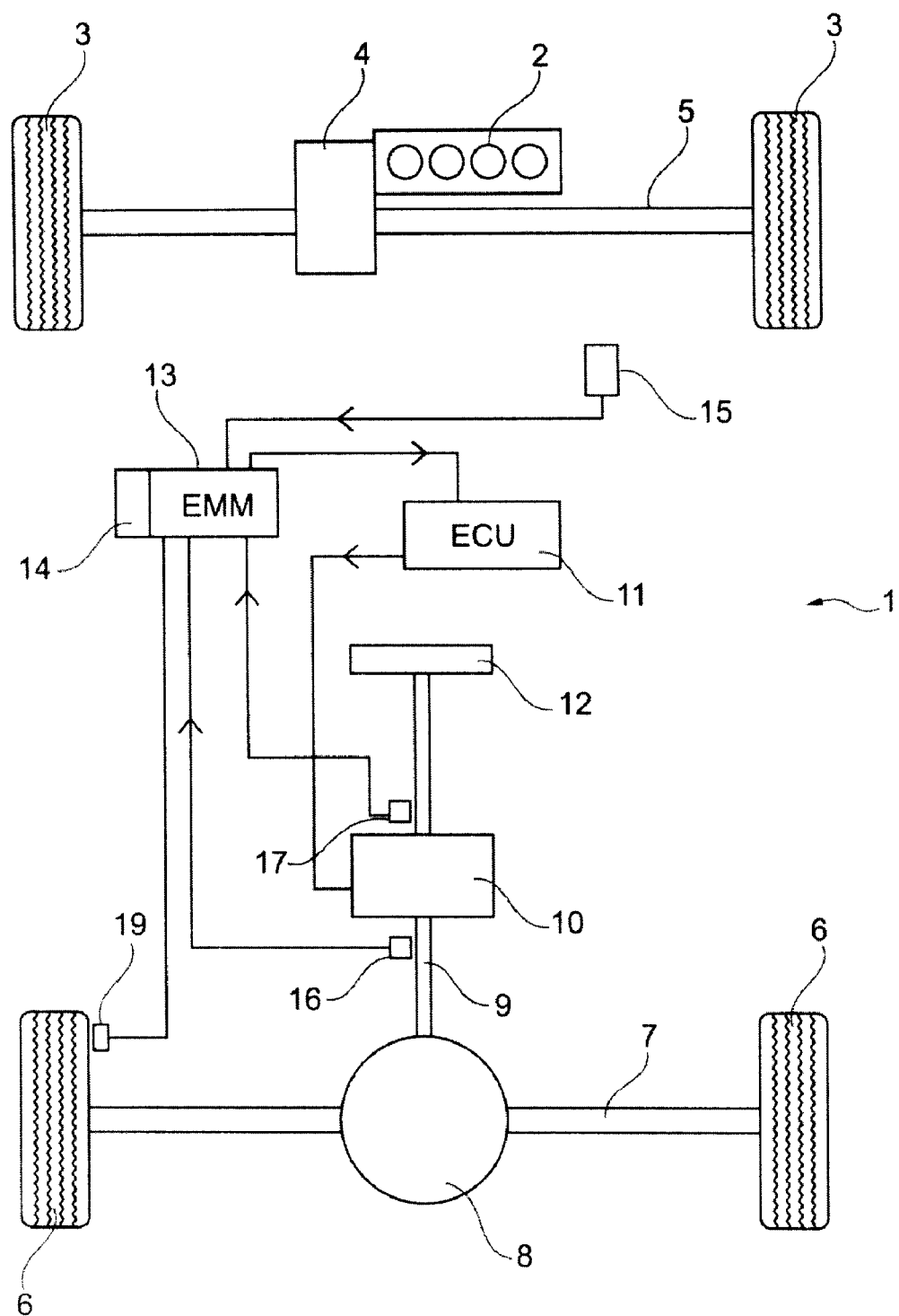

MASS MEASUREMENT OF A FLYWHEEL HYBRID VEHICLE

FIELD OF THE INVENTION

This invention relates to an apparatus and method for measuring the mass of a flywheel hybrid vehicle. A typical flywheel hybrid vehicle incorporates an internal combustion engine as a primary mover and a secondary mover which incorporates a flywheel which acts as an energy storage and recovery device.

BACKGROUND OF THE INVENTION

SAE technical paper 2008-01-0083, Apr. 14-17, 2008, describes an arrangement consisting of a transmission (CVT) having a continuously variable ratio connected between the engine and gearbox of a vehicle and configured to drive a flywheel through a gearset. The arrangement can add or subtract power to that supplied by the engine.

US 2008/0105475 discloses an automotive vehicle having a powertrain for the vehicle, a flywheel and a continuously variable transmission (CVT) which interconnects the powertrain and the flywheel. When the vehicle decelerates, energy from the powertrain and its associated transmission is transferred to the flywheel. Conversely, energy stored in the flywheel can be transferred to the powertrain in order to accelerate the vehicle.

A typical CVT, suitable for use in a flywheel hybrid vehicle, incorporates a steel belt variator and has a ratio spread of around six. Operation of the CVT is usually under the control of an electronic unit which opens and closes solenoid valves in order to regulate the flow of pressurized oil to the variator.

In a typical flywheel hybrid vehicle, the flywheel can be connected to and disconnected from the continuously variable transmission by means of a clutch. For example, the clutch can be opened while the vehicle is moving at a constant speed and then closed when decelerating, allowing the flywheel to spin up. In another mode of operation, once the flywheel has been pre-charged with rotational kinetic energy, the clutch can be closed so that the vehicle's wheels are driven by the flywheel through the CVT thereby supplementing engine power.

For a smooth operation of a flywheel hybrid vehicle, particularly when handing over between flywheel drive and engine drive, it is beneficial to know the vehicle's mass. Further, in order for any vehicle control system to be able to calculate the amount of additional motive power required from a spinning flywheel which is necessary to accelerate the vehicle up to a desired speed, the mass of the vehicle has to be known. If the vehicle control system is aware of the vehicle's mass, it is aware of the amount of energy that can be recuperated from the vehicle and stored in the flywheel for use at a later time. Hence, this permits efficient management of the vehicle's motive power and hence fuel economy savings can be made. Furthermore, once the vehicle's mass is known, the control system can improve the smoothness of the vehicle's deceleration while recuperating energy (in the flywheel) and likewise, improve the smoothness of the vehicle's acceleration while releasing energy from the flywheel. These possibilities significantly reduce the mechanical wear of the CVT's variator and lead to savings in maintenance costs.

The unladen vehicle mass is known from manufacturer's data. However a vehicle's mass will fluctuate depending on the load which it is carrying at any given time. This fluctuation can be significant in the case of goods/commercial vehicles.

The total mass of a commercial vehicle varies between unladen and fully laden and is sometimes even overladen. This means that the ratio between the total kinetic energy of the vehicle at a given road speed compared with the maximum kinetic energy stored in the flywheel can also vary appreciably. A system that does not measure and adapt its operation to this variation will achieve a below optimum fuel saving potential. Furthermore, the driving smoothness during acceleration and deceleration (refinement) will be less than optimal. Lack of driving refinement increases the mechanical strain and wear and tear, ultimately resulting in higher maintenance costs for the operator.

Hence, it would be advantageous to provide a means for measuring any increase in vehicle mass over the unladen mass.

SUMMARY OF THE INVENTION

In a first aspect, the invention consists of an apparatus for measuring the mass of a hybrid vehicle having a prime mover, a secondary mover incorporating a flywheel, and a continuously variable transmission (CVT) being connectable with a driveline of the vehicle and with the flywheel, wherein said apparatus includes means for measuring a rate of change of CVT ratio during a transference of energy between the hybrid vehicle and the flywheel.

In a second aspect, the invention consists of a method for measuring the mass of a hybrid vehicle having a prime mover, a secondary mover incorporating a flywheel, and a continuously variable transmission (CVT) being connected between a driveline of the vehicle and the flywheel, wherein the method includes the steps of: spinning up the flywheel; detecting a driver acceleration demand and; measuring a rate of change of CVT ratio during a transference of energy from the flywheel to the vehicle.

In a third aspect, the invention consists of a method for measuring the mass of a hybrid vehicle having a prime mover, a secondary mover incorporating a flywheel and a continuously variable transmission (CVT) being connected between a driveline of the vehicle and the flywheel, wherein the method includes the steps of: detecting a driver deceleration demand and; measuring a rate of change of CVT ratio during a transference of energy from the vehicle to the flywheel.

In a fourth aspect, the invention comprises a hybrid vehicle having a prime mover, a secondary mover incorporating a flywheel and a continuously variable transmission being connectable with a driveline of the vehicle and with the flywheel, and incorporating the apparatus in accordance with said first aspect of the invention.

A clutch may be provided, located between the continuously variable transmission (CVT) and the flywheel so that the flywheel can be coupled and decoupled from the vehicle's driveline.

Conveniently, rotational speed sensors may be placed either side of the CVT (e.g., on its input and output shafts) and used to measure rotational speeds and therefore enable measurements of rates of change in CVT ratio.

Alternatively, the rate of change of ratio may be deduced from measurements received from rotational sensors placed on the flywheel and on the vehicle's driveline or wheels.

If a flywheel hybrid vehicle is being driven at a given speed and the flywheel is charged with a given energy, for every given vehicle speed a CVT variator ratio can be found which matches the flywheel speed such that the flywheel neither stores nor releases energy to the vehicle. This is defined as the "neutral" speed. If energy recovery takes place when the driver releases the accelerator pedal (without operating the brakes), a typical vehicle control system will deduce a predetermined target value for the deceleration that is required to be achieved by the vehicle by extracting energy and storing it in the flywheel. The energy that needs to be extracted in order to achieve this fixed deceleration depends on the vehicle's mass. Hence, the energy that needs to be transferred to the flywheel to achieve this set deceleration target becomes directly proportional to the vehicle's mass.

By the same token, if energy is released (i.e., transferred from the flywheel to the vehicle) when the driver depresses the accelerator pedal, a typical vehicle control system will deduce a predetermined target value for the acceleration that is required by extracting energy from the flywheel and transferring it to the vehicle. Again, the energy that needs to be extracted in order to achieve this fixed acceleration depends on the vehicle's mass.

The amount of energy that is stored in the flywheel can be measured by the amount of flywheel acceleration such as is required over and above the flywheel neutral speed. Flywheel acceleration is achieved by the correct choice of variator ratio. Therefore, vehicle mass can be determined by monitoring the rate of change in variator ratio away from the neutral ratio during periods when the driver releases the accelerator pedal (without operating the brakes) or depresses the accelerator pedal.

Say, for example, that the vehicle is travelling at a constant speed on a level road and that the flywheel has been pre-charged and spun up to a particular angular speed. The flywheel has a known inertia and the amount of energy stored therein can be calculated of knowing its inertia and rotational speed. This energy (minus some small aerodynamic and frictional losses) can be transferred to the vehicle's driveline when the flywheel is coupled to the CVT. For an unladen vehicle the rate of change of CVT ratio will have a particular value. When the vehicle is fully laden, its greater mass means that the CVT's variator will have to work harder in order to transfer energy between the flywheel and vehicle's driveline. Therefore, the rate of change of ratio will change in proportion to the increase in mass.

Aerodynamic and frictional losses will have an effect and can also vary with vehicle speed. Such losses can be determined from manufacturer's data or alternatively through measurements of 'coast down' parameters whilst the vehicle is being driven. The mass measurements can then be corrected accordingly. A lookup table may be formulated for this purpose.

Preferably, the measurements are carried out on level ground. If the vehicle is travelling either up or do down a gradient, the mass measurement will be in error owing to the effect of the gradient. This effect of the gradient can be calculated and compensated for if the vehicle is fitted with an instrument for measuring the gradient such as an on-board inclinometer or global positioning/navigation equipment.

Knowledge of the mass of the vehicle enables a feed-forward strategy to be used when controlling the deployment of the primary and secondary movers. If vehicle mass is known, a control system can predict by how much the vehicle will accelerate for a given flywheel stored energy. It can also predict how much energy can be stored in the flywheel when the vehicle brakes. This provides fuel-saving benefits.

DESCRIPTION OF THE DRAWING

FIG. 1 shows a schematic diagram of an embodiment of the present invention.

DESCRIPTION OF AN EMBODIMENT OF THE INVENTION

An embodiment of the invention will now be described, by way of example only, with reference to the drawing which is a schematic representation of a flywheel hybrid vehicle incorporating mass measurement apparatus in accordance with the invention.

A vehicle 1 includes an internal combustion engine 2 driving a pair of front wheels 3 through a gearbox 4 and a front axle 5. A pair of rear wheels 6 is connected via a rear axle 7, differential 8 and propshaft 9 to a continuously variable transmission (CVT) 10. The CVT 10 is of the steel belt variator type and its operation is under the control of an electronic control module (ECU) 11. The ECE 11 opens and closes solenoid valves (not shown) in order to regulate the flow of pressurized oil to the variator. The CVT 10 is connected to a flywheel 12.

An electronic measurement module (EMM) 13, which contains a 20 store 14, communicates with the ECU 11 and also receives an input from an accelerator pedal position sensor 15.

Two rotational speed sensors 16, 17 are located either side of the CVT 10. One of these, 16 is located on the propshaft side of the CVT 10 (denoted as the output shaft of the CVT 10 in this example) and the other, 17, is located on the flywheel side (denoted as the input shaft of the CVT 10 in this example).

The EMM 13 receives measurements from both rotational speed 5 sensors 16, 17 and also from a wheel speed sensor 19.

Store 14 contains a value for the moment of inertia of the flywheel 12 and vehicle calibration data. In particular, it contains calibration data relating to the expected rate of change of variator ratio, during the transference of a given amount of energy between the flywheel 12 and the vehicle 1, measured when the vehicle 1 is in its unladen state. The store 14 also contains a look-up table of aerodynamic and frictional losses for a range of vehicle speeds. This look-up table can be compiled from initial calibration and test data.

In this example, a vehicle mass measurement is carried out during a transference of energy from the flywheel 12 to the vehicle 1. Prior to the commencement of the measurement process, the flywheel is spun up to a certain speed, say 60,000 rpm. This is measured by the speed sensor 17 and recorded by the EMM 13. Knowing the moment of inertia of the flywheel 12 from data stored in the store 14, the EMM 13 can calculate the amount of energy available for release to the vehicle to satisfy an acceleration demand.

The measurement process is commenced by the EMM 13 detecting a vehicle acceleration demand. The driver, wanting the vehicle to accelerate, demands an increase in torque (from the secondary mover in this case) by depressing the accelerator pedal by a certain amount. Say, for example, the driver wishes to accelerate from 30 mph to 40 mph. He will keep the pedal depressed until the vehicle reaches the desired target speed. A fully laden vehicle will reach the target speed more slowly than an unladen one. The accelerator pedal position sensor 15 detects the movement and its magnitude and conveys this to the EMM 13. The EMM 13, using the vehicle calibration data stored in the store 14, calculates the value of the additional torque demanded by the driver which equates to the position of the accelerator pedal. Given that there is sufficient energy already in the flywheel in order to meet the extra torque demand, the EMM 13 sends a signal to the ECU 11 instructing it to increase hydraulic pressure to the CVT variator in order for the CVT to start transferring the energy stored in the flywheel 12 to the vehicle 1.

The extra torque demanded is equivalent to an energy flow from the flywheel 12 to the vehicle 1. The final result of this energy flow is a drop in flywheel rotational speed (i.e., the CVT input shaft) and a corresponding increase of rotational speed of the CVT output shaft. Again, given the flywheel's moment of inertia, the EMM 13 knows the rotational speed to which the flywheel has to drop before the requisite amount of energy has been released. Hence, while this energy is being transferred, a value for the rate of change of the CVT variator ratio is computed from measurements of the rotational speeds of the CVT output and input shafts provided by the sensors 16,17. This computed value is compared with the expected value for an unladen vehicle. The amount by which the computed value deviates from the expected value is proportional to the vehicle's mass increase.

To improve the accuracy of the measurements, aerodynamic and frictional effects can be compensated for (for a given vehicle speed) by referring to the look-up table in the store 14.

In an alternative method, a similar mass measurement can be made during a transfer of energy from the vehicle to the flywheel. This process follows a deceleration demand made by the driver. Such a demand may be made by the driver merely lifting his foot of the accelerator pedal or (additionally) depressing the brake pedal. In the case where the brake pedal is depressed, the hydraulic brakes are not activated, the desired retardation being solely provided by the action of the flywheel spinning up (i.e., storing energy).

The invention claimed is:

1. An apparatus for measuring the mass of a hybrid vehicle, comprising a prime mover driveably connected to a first set of vehicle wheels but not connected to a second set of wheels, a secondary mover including a flywheel, and a continuously variable transmission (CVT) including an output driveably connected to a second set of vehicle wheels but not to the first set of wheels, and an input driveably connected with the flywheel and driveably unconnected to the prime mover, and means for measuring a rate of change of a CVT ratio during a transference of energy between the hybrid vehicle and the flywheel.

2. An apparatus according to claim 1, in which the means for measuring the rate of change of CVT ratio includes rotational speed sensors placed at either side of the CVT.

3. A method for measuring the mass of a hybrid vehicle having a prime mover, a secondary mover incorporating a flywheel, and a continuously variable transmission, wherein the method includes the steps of: maintaining the prime mover driveably connected to a first set of vehicle wheels but unconnected to a second set of wheels; maintaining an output of the continuously variable transmission driveably connected to a second set of vehicle wheels but unconnected to the first set of wheels; maintaining an input of the continuously variable transmission driveably connected with the flywheel; spinning up the flywheel while the flywheel is driveably unconnected with the prime mover; detecting a driver acceleration demand; and measuring a rate of change of a CVT ratio during a transference of energy from the flywheel to the vehicle.

4. A method for measuring the mass of a hybrid vehicle having a prime mover, a secondary mover incorporating a flywheel, and a continuously variable transmission, wherein the method includes the steps of: maintaining the prime mover driveably connected to a first set of vehicle wheels but unconnected to a second set of wheels; maintaining an output of the continuously variable transmission driveably connected to a second set of vehicle wheels but unconnected to the first set of wheels; maintaining an input of the continuously variable transmission driveably connected with the flywheel; maintaining the flywheel driveably unconnected with the prime mover; detecting a driver deceleration demand; measuring a rate of change of CVT ratio during a transference of energy from the flywheel to the vehicle; and by monitoring the rotational speeds of input and output shafts of the CVT.

* * * * *